United States Patent [19]
Takahashi et al.

[11] Patent Number: 5,501,737
[45] Date of Patent: Mar. 26, 1996

[54] COATING METHOD AND APPARATUS HAVING AN EXCHANGEABLE RESISTING BODY INSERTABLE IN THE RESERVOIR

[75] Inventors: Shinsuke Takahashi; Norio Shibata, both of Kanagawa, Japan

[73] Assignee: Fuji Photo Film Co., Ltd., Kanagawa, Japan

[21] Appl. No.: 257,506

[22] Filed: Jun. 8, 1994

Related U.S. Application Data

[63] Continuation of Ser. No. 981,302, Nov. 25, 1992, abandoned.

[30] Foreign Application Priority Data

Nov. 26, 1991 [JP] Japan .................................. 3-335576

[51] Int. Cl.⁶ .................................................. B05C 3/18
[52] U.S. Cl. .................................... 118/410; 118/419
[58] Field of Search ............................ 118/410, 411, 118/419; 425/461

[56] References Cited

U.S. PATENT DOCUMENTS

| | | | |
|---|---|---|---|
| 3,860,383 | 1/1975 | Sirevicius | 425/461 |
| 4,182,606 | 1/1980 | Gibbon | 425/461 |
| 4,411,614 | 10/1983 | Feathers | 425/466 |
| 4,605,573 | 8/1986 | Deeg et al. | 427/424 |
| 5,099,786 | 3/1992 | Shibata et al. | 118/410 |
| 5,167,712 | 12/1992 | Shibata et al. | 118/410 |
| 5,209,954 | 5/1993 | Takahashi et al. | 427/430 |

*Primary Examiner*—Brenda A. Lamb
*Attorney, Agent, or Firm*—Sughrue, Mion, Zinn, Macpeak & Seas

[57] ABSTRACT

In a coating head, the configurations of the gap quantity d of a slit, the ejection width w of the slit, etc. are established on the basis of a relational expression in which extremely important factors in practical coating, such as the coating composition viscosity in a reservoir, the pressure loss coefficient of coating composition and the coating composition viscosity in the slit, are taken into consideration, and at the same time, an exchangeable cylindrical shaft is inserted into the reservoir to make the flow resistance in the reservoir controllable.

6 Claims, 3 Drawing Sheets

COATING METHOD AND APPARATUS HAVING AN EXCHANGEABLE RESISTING BODY INSERTABLE IN THE RESERVOIR

REFERENCE TO RELATED APPLICATION

This is a continuation of application No. 07/981,302, filed Nov. 25, 1992, now abandoned.

FIELD OF THE INVENTION

The present invention relates to a coating apparatus in which an extrusion-type coating head is provided for constantly and uniformly coating the surface of a running flexible support with a coating composition extruded continuously thereto.

BACKGROUND OF THE INVENTION

In conventional coating methods for coating a running flexible support (hereinafter referred to as "a web") with a coating composition such as a magnetic coating composition or the like, for example, an extrusion-type coating apparatus, a curtain-flow-type coating apparatus, a blade-doctor-type coating apparatus, a slide-coat-type coating apparatus, etc., are generally used. Of those methods, a coating method using an extrusion-type coating apparatus which can realize coating of an uniform thin layer has been used in various fields.

According to such an extrusion-type coating apparatus, however, it is impossible to obtain a wide range of good coating conditions so that there has been a problem in that desired coating cannot be performed under the conditions of high viscosity, thin film coating, and high speed coating. Particularly, in a method of producing a magnetic recording medium. The following conditions exist. The thickness of a web is extremely thin. The ferromagnetic coating composition has a so-called thixotropy. Also, a magnetic substances are improved as a result of advancement in making a magnetic recording medium have a high recording density so that oxidized magnetic powder of a high $S_{BET}$ or a barium ferrite material is used so as to make a magnetic coating composition more viscous. Accordingly, there is a tendency that longitudinal stripes of color unevenness (thickness unevenness) occur more frequently as the coated layer becomes thinner and coating speed becomes higher.

This is because, if the inner diameter of a reservoir of a coating head is too small, or the coating width of a slit is too wide, the pressure of the coating composition in the reservoir is reduced largely from the coating composition supply side toward the opposite side, so that the quantity of the coating composition ejected from the slit at the coating head top end portion changes largely in the direction of the width of the coating head.

As a result of analyzing these problems, there has been a proposal as disclosed in Japanese Unexamined Patent Publication No. Hei-1-180266. According to this proposal, in an extrusion-type coating head, the quantity of coating, the gap quantity of a slit, the length of a slit, the ejection width of the slit and the inner diameter of a reservoir are established so as to satisfy a predetermined relational expression to thereby restrain the above-mentioned change of coating quantity in the width direction of a coating head to make the film thickness of a coating film uniform.

If a coating apparatus is established according to such a relational expression, however, it is necessary to make the slit length extremely long, or to set the slit gap to be extremely narrow. That is, the nozzle portion of the coating apparatus becomes very large in the former case, while in the latter case foreign matter tends to be trapped in the slit so that a great number of longitudinal stripes are generated in the coated surface. Thus, either of the former and latter cases is not practical. Further, although the above-mentioned relational expression is established on the assumption that the coating composition obeys poiseuille flow in the reservoir, any practical coating composition is so strongly non-Newtonian that the apparent viscosity dominating its liquid property is changed by the flow speed, and the apparent viscosity is also changed in the reservoir or in the slit, so that it is still difficult to obtain uniform film thickness even if the coating apparatus is constructed according to the above-mentioned relational expression using parameters of only the sizes of respective parts of the coating apparatus.

Therefore, a further proposal was disclosed in Japanese Unexamined Patent Publication No. Hei-3-202171 by it is possible to provide a coating apparatus in which the coating quantity, the slit gap quantity, the slit length, the slit ejection width, the inner diameter of the reservoir, and the viscosity of the coating composition are established so as to satisfy a predetermined relational expression, and the liquid property due to thixotropy at the time of performing coating with a coating composition is taken into consideration so that generation of color unevenness or longitudinal stripes is effectively restrained, a coated layer having superior quality to that of conventional layers can be formed, and magnetic recording media excellent in electromagnetic conversion property can be manufactured.

However, even in such a coating apparatus, to obtain a uniform film thickness it is necessary to adhere strictly to the predetermined relational expression. The shape of the coating head thus greatly depends on the specific coating conditions such as the coating film thickness, the coating speed, the kind of the coating composition, and so on. That is, even if a coating apparatus is provided according to the relational expression disclosed in Japanese Unexamined Patent Publication No. Hei-3-202171, it is necessary to reconstruct the coating head when the above-mentioned coating conditions are changed, thus resulting in a problem in that the cost to produce the coating head is increased. Each coating head is severely limited to use only under certain specific coating conditions.

SUMMARY OF THE INVENTION

It is therefore an object of the present invention to solve the foregoing problems, and to provide a coating method and an apparatus therefor, which are low in cost and easy in operation, and by which it is possible to effectively restrain color unevenness or longitudinal stripes from being produced, and it is possible to make the film thickness of coating film uniform.

The foregoing object of the present invention can be attained by a coating apparatus in which a part of a coating composition supplied to a reservoir is continuously discharged from one end of the reservoir so that the coating composition is discharged from a top end portion of a slit disposed in opposition to the surface of a continuously moving flexible belt-like support to thereby coat the surface of the support with a thin film of the coating composition; characterized in that an exchangeable resisting body is inserted into the reservoir to adjust flow resistance in the reservoir under a condition to satisfy the following expression $$\frac{\frac{12\eta_s}{d^3 w} q(L_1 - L_2) - f(p)\eta_p wQ}{\left[\frac{12\eta_s}{d^3 w} q(L_1 + L_2) + f(p)\eta_p wQ\right] \times 0.5} \leq 0.05$$

in which d represents the gap quantity of the slit, $L_1$ represents the slit depth from a coating composition supply side end of the reservoir to the top end portion of the slit, $L_2$ represents the slit depth from the coating composition discharge side end of the reservoir to the top end portion of the slit, w represents the ejection width of the slit, $\eta_p$ represents the viscosity of the coating composition in the reservoir, $\eta_s$ represents the viscosity of the coating composition in the slit, Q represents the average flow rate in the reservoir, q represents the flow rate of the coating composition ejected from the slit, and f(p) represents the pressure loss coefficient of the coating composition in the reservoir.

The foregoing object of the present invention can be also attained by a coating apparatus in which a part of a coating composition supplied to a reservoir is continuously discharged from one end of the reservoir so that the coating composition is discharged from a top end portion of a slit disposed in opposition to the surface of a continuously moving flexible belt-like support to thereby coat the surface of the support with a thin film of the coating composition, characterized in that an exchangeable cylindrical resisting body is inserted into the reservoir under a condition to satisfy the following expression $$\frac{\frac{12\eta_s}{d^3 w} q(L_1 - L_2) - \frac{128}{\pi D^4}\left((1-k^4)\frac{(1-k^2)^2}{\ln(1/k)}\right)^{-1} \eta_p wQ}{\left[\frac{12\eta_s}{d^3 w} q(L_1 + L_2) + \frac{128}{\pi D^4}\left((1-k^4)\frac{(1-k^2)^2}{\ln(1/k)}\right)^{-1} \eta_p wQ\right] \times 0.5} \leq 0.05$$

in which d represents the gap quantity of the slit, $L_1$ represents the slit depth from a coating composition supply side end of the reservoir to the top end portion of the slit, $L_2$ represents the slit depth from the coating composition discharge side end of the reservoir to the top end portion of the slit, w represents the ejection width of the slit, $\eta_p$ represents the viscosity of the coating composition in the reservoir, $\eta_s$ represents the viscosity of the coating composition in the slit, Q represents the average flow rate in the reservoir, q represents the flow rate of the coating composition ejected from the slit, D represents the inner diameter of the reservoir, R represents the diameter of the resisting body, and k represents the inner diameter ratio (R/D) of the reservoir.

BRIEF DESCRIPTION OF THE DRAWINGS

The preferred embodiments of the invention will be explained below in conjunction with the following figures.

DETAILED DESCRIPTION OF THE PREFERRED EMBODIMENTS

Embodiments of the present invention will be described in detail with reference to the drawings.

Figure 1:
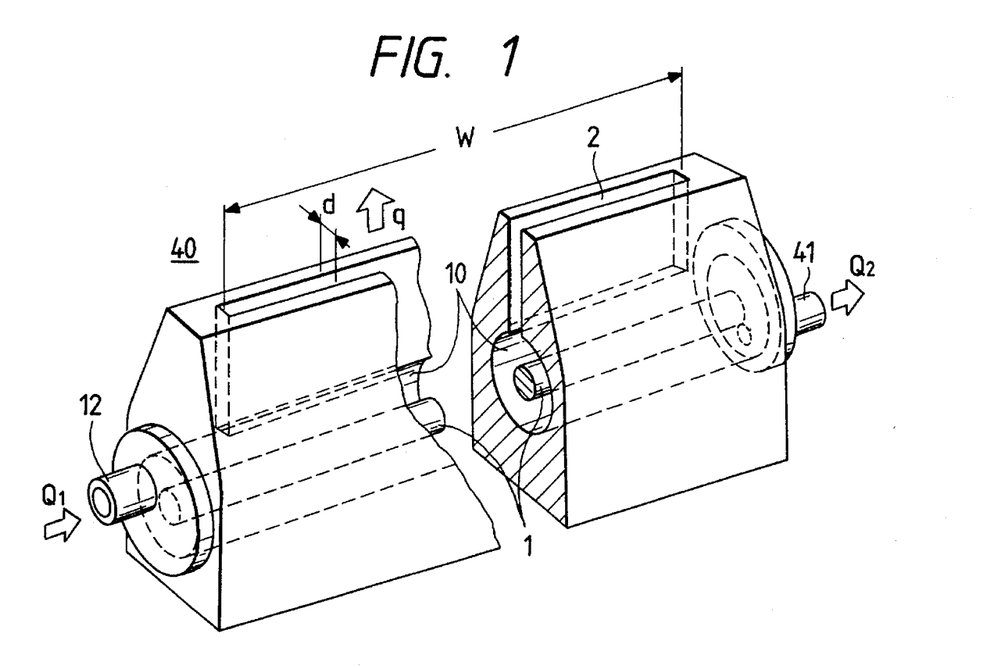
FIG. 1 is a perspective view, partly in section, illustrating a main portion of a coating apparatus according to an embodiment of the present invention.
Figure 2:
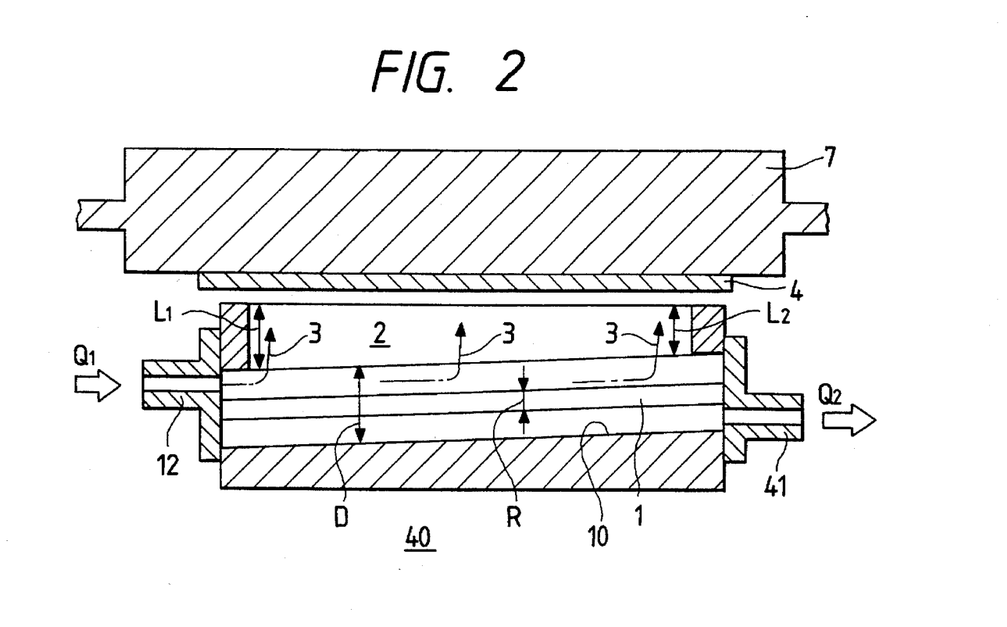
FIG. 2 is a schematic sectional view illustrating a main portion of the coating apparatus according to the embodiment of the present invention.

FIGS. 1 and 2 show an extrusion-type coating head for carrying out the present invention, in which a top end portion of a slit 2 of a coating head 40 is made perpendicularly opposite to the lower surface of a web 4 with a slight gap (usually 2 to 150 mm) therebetween, the web 4 being moved at a constant speed while being supported by backing roll 7. A coating composition 3 is pressed so that it is fed continuously from a coating composition feed nozzle 12 into a reservoir 10 by a supply quantity $Q_1$ higher than the quantity q of flow of the coating composition ejected onto the surface of the web 4. A part of the coating composition 3, that is, an excess of the coating composition in the reservoir 10, is extracted by the force of a drawing pump $P_2$ (not shown) as an external coating-composition discharge means through a coating composition discharge nozzle 41 attached to the farthest position from the coating composition feed nozzle 12 in the width direction of the web 4, that is, the other end of the reservoir 10. It is therefore possible to improve some problems, to some degree, such an non-uniformness of the liquid pressure distribution or liquid condensation caused by the extraction of the coating composition 3 after the reservoir 10 is fully filled with the coating composition 3. That is, the pressure distribution of the coating composition 3 is not strictly uniform in the width direction of the web 4 so as to produce a gradual pressure decrease toward the coating composition discharge nozzle 41.

In addition to such a configuration as mentioned above, as a constituent feature of the present invention, the depth of the slit 2, that is, the slit length from the reservoir 10 to the top end of the coating head, is established so as to be reduced gradually from the coating composition feed nozzle 12 side to the coating composition discharge nozzle 41 side, and the reservoir 10 is arranged into a double-cylindrical shape by inserting a shaft 1 as an exchangeable cylindrical resisting body into the reservoir 10 over the width direction of the coating apparatus. Further, sizes of respective parts of the apparatus are set and arranged so as to satisfy the following expression $$\frac{\frac{12\eta_s}{d^3w} q(L_1 - L_2) - \frac{128}{\pi D^4} \left( (1-k^4) \frac{(1-k^2)^2}{\ln(1/k)} \right)^{-1} \eta_p w Q}{\left[ \frac{12\eta_s}{d^3w} q(L_1 + L_2) + \frac{128}{\pi D^4} \left( (1-k^4) \frac{(1-k^2)^2}{\ln(1/k)} \right)^{-1} \eta_p w Q \right] \times 0.5} \leq 0.05$$

In the above expression, D represents the inner diameter of the reservoir 10, d represents the gap quantity of the slit 2, $L_1$ represents the slit depth from the coating composition supply side end of the reservoir 10 to the slit top end portion, $L_2$ represents the slit depth from the coating composition discharge side end of the reservoir 10 to the slit top end portion, w represents the ejection width of the slit 2, $\eta_p$ represents the coating composition viscosity in the reservoir 10, $\eta_s$ represents the coating composition viscosity in the slit 2, and k represents the inner diameter ration (R/D) of the reservoir 10 on the assumption that the diameter of the shaft 1 is represented by R.

A different resisting body, having different characteristics, may be inserted when different coating conditions are required. Therefore, the same coating apparatus can be used under a plurality of different conditions by merely exchanging one resisting body for another.

With respect to viscosity, the coating composition 3, in which a magnetic substance or carbon black is dispersed into a solvent, has a physical property which can be expressed by Casson's equation (equation presented by N. Casson).

That is, each viscosity $\eta$ can be expressed by the following expression $$\eta = \frac{(a + b \times \gamma^{1/2})^2}{\gamma}$$

Next, as for the shearing speed $\gamma_p$ in the reservoir 10, a speed profile of laminar flow/completely developed flow of a double cylinder is considered as a model thereof. Assuming the average flow rate at that time is Q, the outer and inner diameters of the pipe are D and R respectively, and the inner diameter ration (R/D) of the pipe is k, the shearing speed $\gamma_p$ can be expressed by the diameter D of the reservoir 10, the average flow rate Q and the inner diameter k as shown by the following expression $$\gamma_p = \frac{32Q}{\pi D^3 (1-k^2)(1-k)}$$

As for the shearing speed $\gamma_s$ in the slit 2, a profile of an isosceles triangle with the slit center as its apex can be assumed as a model of the flow rate. Then the speed of flow u at a desired point of the distance y from the center line is expressed by the following expression $$u = \frac{4q}{wd^2}(d/2 - y)$$

Therefore the shearing speed $\gamma_s$ can be expressed by the following expression $$\gamma_s = \frac{\delta u}{\delta y} = \frac{4q}{wd^2}$$

The above variable q represents the flow rate of the coating composition 3 being ejected from the slit 2.

Figure 5:
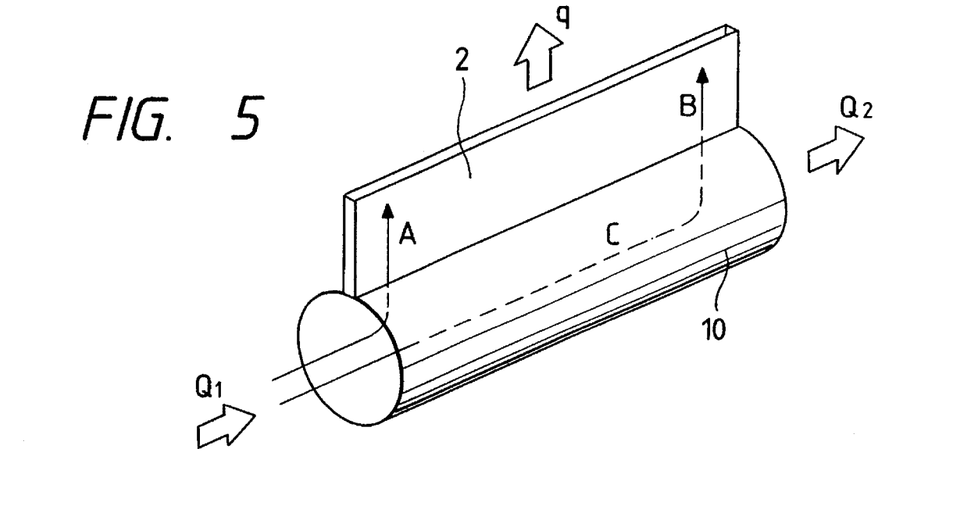
FIG. 5 is a model diagram illustrating a flow path model of a slit and a reservoir in the coating head according to the present invention.

Further, according to the basic concept of the present invention, the distribution of the quantity of ejection is intended to be uniformized in the consideration of the pressure loss difference produced when the coating composition 3 passes through the respective paths of the coating apparatus. That is, with reference to a flow path model of the slit 2 and the reservoir 10 in a coating head in FIG. 5, the rate of scattering of the quantity of ejection of the coating composition in the slit width direction can be obtained from the pressure loss difference between the considered paths A and (C+B), by making calculation through the following expression $$\frac{\text{difference of pressure loss between paths } A \text{ and } (C+B)}{\text{average of pressure losses of paths } A \text{ and } (C+B)}$$

and then the absolute value of the obtained value is taken as shown in the following expression $$\frac{\zeta_A - (\zeta_C + \zeta_B)}{[\zeta_A + (\zeta_C + \zeta_B)] \, 0.5}$$

The above $\zeta_A$, $\zeta_B$ and $\zeta_C$ represent pressure losses in the above-mentioned paths A, B and C respectively, and the respective values of them can be obtained from the expressions $$\gamma_p = \frac{32Q}{\pi D^3 (1-k^2)(1-k)}$$

and $$\gamma_s = \frac{\delta u}{\delta y} = \frac{4q}{wd^2}$$

as shown by the following expression $$\zeta_A = \frac{12\eta_s}{d^3w} q \times L_1$$

$$\zeta_B = \frac{12\eta_s}{d^3w} q \times L_2$$

$$\zeta_A = \frac{128 \eta_p w}{\pi D^4} Q$$

It is therefore possible to derive the above-mentioned expression $$\frac{\frac{12\eta_s}{d^3w} q(L_1 - L_2) - \frac{128}{\pi D^4} \left( (1-k^4) \frac{(1-k^2)^2}{\ln(1/k)} \right)^{-1} \eta_p w Q}{\left[ \frac{12\eta_s}{d^3w} q(L_1 + L_2) + \frac{128}{\pi D^4} \left( (1-k^4) \frac{(1-k^2)^2}{\ln(1/k)} \right)^{-1} \eta_p w Q \right] \times 0.5} \leq 0.05$$

by substituting these values of $\zeta_A$, $\zeta_B$ and $\zeta_C$ into the above-mentioned expression $$\frac{\zeta_A - (\zeta_C + \zeta_B)}{[\zeta_A + (\zeta_C + \zeta_B)] \times 0.5}$$

It has been known that a coating film of high quality can be obtained by setting the standard of regulation of film thickness to about ±5%. Therefore, by setting the allowable value of the above expression $$\frac{\frac{12\eta_s}{d^3w} q(L_1 - L_2) - \frac{128}{\pi D^4} \left( (1 - k^4) \frac{(1 - k^2)^2}{\ln(1/k)} \right)^{-1} \eta_p w Q}{\left[ \frac{12\eta_s}{d^3w} q(L_1 + L_2) + \frac{128}{\pi D^4} \left( (1 - k^4) \frac{(1 - k^2)^2}{\ln(1/k)} \right)^{-1} \eta_p w Q \right] \times 0.5} \leq 0.05$$

to about ±5%, and constituting the coating head 40 by use of this as a standard, it is possible to perform coating with an extremely high accuracy.

Further, assuming that the expression $$\frac{128}{\pi D^4} \left( (1 - k^4) - \frac{(1 - k^2)^2}{\ln(1/k)} \right)^{-1}$$

included in the above-mentioned expression $$\frac{\frac{12\eta_s}{d^3w} q(L_1 - L_2) - \frac{128}{\pi D^4} \left( (1 - k^4) \frac{(1 - k^2)^2}{\ln(1/k)} \right)^{-1} \eta_p w Q}{\left[ \frac{12\eta_s}{d^3w} q(L_1 + L_2) + \frac{128}{\pi D^4} \left( (1 - k^4) \frac{(1 - k^2)^2}{\ln(1/k)} \right)^{-1} \eta_p w Q \right] \times 0.5} \leq 0.05$$

represents a pressure loss coefficient f(p) of the coating composition in the reservoir which depends on the sizes and shapes of the reservoir and the resisting body, the above-mentioned expression $$\frac{\frac{12\eta_s}{d^3w} q(L_1 - L_2) - \frac{128}{\pi D^4} \left( (1 - k^4) \frac{(1 - k^2)^2}{\ln(1/k)} \right)^{-1} \eta_p w Q}{\left[ \frac{12\eta_s}{d^3w} q(L_1 + L_2) + \frac{128}{\pi D^4} \left( (1 - k^4) \frac{(1 - k^2)^2}{\ln(1/k)} \right)^{-1} \eta_p w Q \right] \times 0.5} \leq 0.05$$

can be expressed as a general expression as shown in the following expression $$\frac{\frac{12\eta_s}{d^3w} q(L_1 - L_2) - f(p)\eta_p w Q}{\left[ \frac{12\eta_s}{d^3w} q(L_1 + L_2) + f(p)\eta_p w Q \right] \times 0.5} \leq 0.05$$

Figure 4:
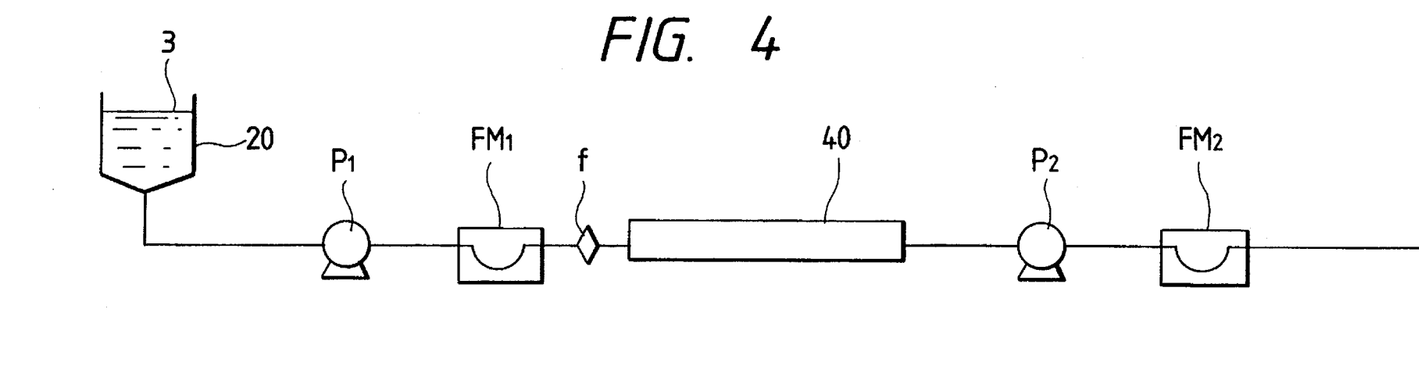
FIG. 4 is a schematic diagram of a coating process using the coating apparatus shown in FIG. 1.

FIG. 4 shows a schematic diagram of a coating composition feeding system of this embodiment using the coating head 40 having such a configuration as mentioned above.

The coating composition 3 stored in a stock tank 20 is fed out by a feeding pump $P_1$ to the coating head 40 through a filter f while the flow rate of the coating composition is being measured by a flow meter $FM_1$. At the same time, a part of the coating composition 3 in the coating head is extracted by a drawing pump $P_2$ as an external discharge means of a different system from the feeding system, while the flow rate of the coating composition is being measured by a flow meter $FM_2$. Therefore, the ejecting flow rate (q) of the coating composition 3 flowing out of the slit 2 is such that the coating composition is deposited on the web 4 by the quantity expressed by the difference of flow rate $(Q_1 - Q_2)$ between the measurement values of the respective flow meters $FM_1$ and $FM_2$.

Preferably, the feeding and drawing pumps $P_1$ and $P_2$ can feed the coating composition smoothly and stably, while they are not limited to a special type of pump. Particularly, the drawing pump $P_2$ may be a pump for circulating the coating composition 3 or any other pump, so long as it has a function to draw the coating composition 3 from the discharge nozzle 41.

According to a coating apparatus having such a configuration as mentioned above, the quantity of the coating composition ejected from the slit 2 of the coating head 40 can be controlled minutely by the feeding and drawing pumps $P_1$ and $P_2$, and also the flow speed in the reservoir can be controlled. In addition thereto, since the depth of the slit 2 is changed desirably on the coating composition supply and discharge sides, the flow out resistance of the coating composition 3 flowing out of the slit 2 can be made correspondent to the change of pressure produced in the coating composition 3 in the reservoir 10, so that it is possible to maintain the distribution of flow rate of the coating composition 3 in the slit width direction to be uniform. Further by changing the diameter of the shaft 1 desirably, it is possible to change the pressure loss $\zeta_c$ of the coating composition 3 in the reservoir 10, so that it is possible to effectively restrain color unevenness or longitudinal stripe from being produced even if the conditions of coating are changed, so that it is easy to set and change the coating head 40 satisfying the above expression $$\frac{\frac{12\eta_s}{d^3w} q(L_1 - L_2) - \frac{128}{\pi D^4} \left( (1 - k^4) \frac{(1 - k^2)^2}{\ln(1/k)} \right)^{-1} \eta_p w Q}{\left[ \frac{12\eta_s}{d^3w} q(L_1 + L_2) + \frac{128}{\pi D^4} \left( (1 - k^4) \frac{(1 - k^2)^2}{\ln(1/k)} \right)^{-1} \eta_p w Q \right] \times 0.5} \leq 0.05$$

by which the film thickness of a coating film can be uniformized.

Further, since the shaft 1 is provided within the reservoir 10, the shearing speed of the coating composition 3 in the reservoir 10 increases to improve the property of dispersion, so that the electromagnetic conversion property of a magnetic layer is improved.

The present invention is not to be limited to the coating apparatus of the above-mentioned embodiment, but can be applied to various coating apparatuses.

Figure 3:
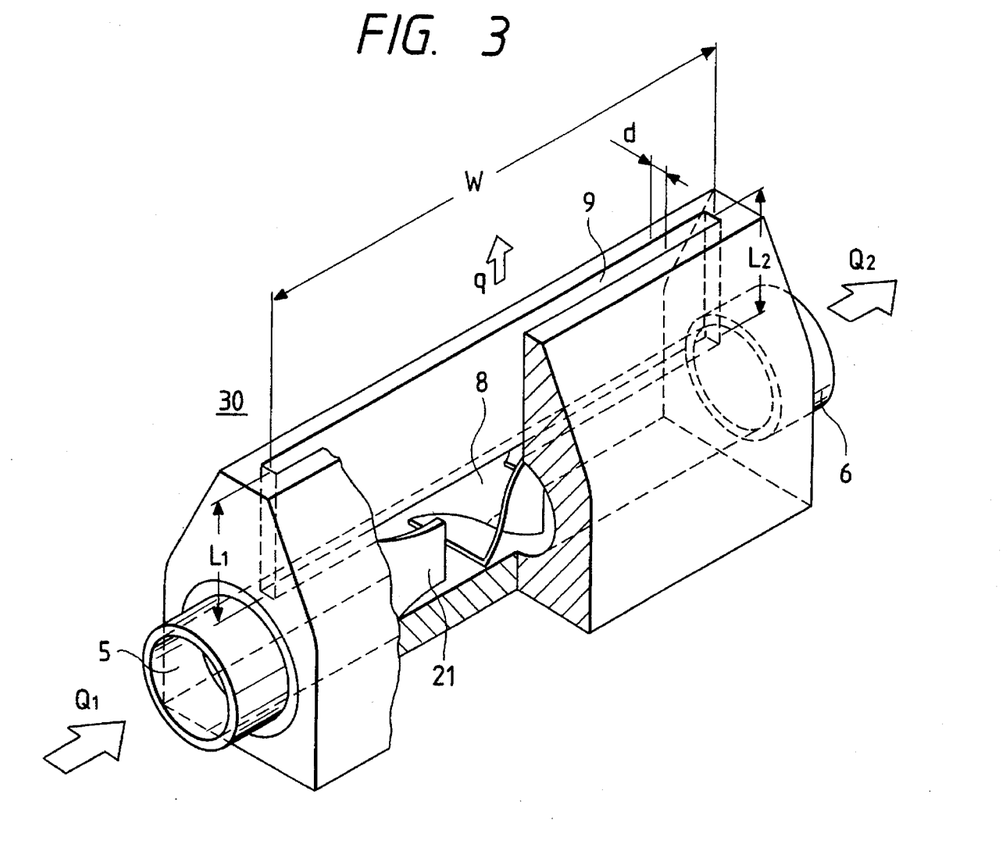
FIG. 3 is a perspective view, partly in section, illustrating a main portion of a coating apparatus according to another embodiment of the present invention.

For example, a coating head 30 based on another embodiment of the present invention is shown in FIG. 3, in which a static mixer 21 having a spiral portion is provided in a reservoir as a resisting body instead of the shaft 1, a coating composition 3 is pressed so as to be fed continuously from a coating composition feed nozzle 5 by the supply quantity $Q_1$ more than the flow rate of coating composition ejected onto the surface of an above-mentioned web 4 in the same manner as the above-mentioned coating head 40, and a part of the coating composition 3 is extracted as an excess coating composition in the reservoir 8 through a coating composition discharge nozzle 6.

Further, as a constituent feature of the present invention, the depth of the slit 9 is arranged to get smaller gradually from the coating composition feeding nozzle 5 side to the coating composition discharge nozzle 6 side, and the static mixer 21 is inserted as an exchangeable resisting body into the reservoir 8 over the width direction of coating. Further the sizes of respective parts are arranged to satisfy the following expression $$\frac{\frac{12\eta_s}{d^3w}q(L_1-L_2)-f(p)\eta_p wQ}{\left[\frac{12\eta_s}{d^3w}q(L_1+L_2)+f(p)\eta_p wQ\right]\times 0.5} \leq 0.05$$

In the above expression, d represents the gap quantity of the slit 9, $L_1$ represents the slit depth from the coating composition supply side end of the reservoir 8 to the slit top end portion, $L_2$ represents the slit depth from the coating composition discharge side end of the reservoir 8 to the slit top end portion, w represents the ejection width of the slit 9, $\eta_p$ represents the coating composition viscosity in the reservoir 8, $\eta_s$ represents the coating composition viscosity in the slit 9, and f(p) represents a pressure loss coefficient of the coating composition in the reservoir 8.

Therefore, by changing the shape of the static mixer 21 desirably, it is possible to change the pressure loss coefficient f(p) of the coating composition 3 in the reservoir 8, so that it is possible to effectively restrain color unevenness or longitudinal stripes from being produced even if the conditions of coating are changed, so that it is easy to set and change the coating head 30 satisfying the above expression by which the film thickness of a coating film can be uniformized.

Further, since the static mixer 21 is provided in the reservoir 8, the shearing speed of the coating composition 3 in the reservoir 8 increases to improve the property of dispersion, so that the electromagnetic conversion property of a magnetic layer can be improved.

The above-mentioned coating composition feed nozzles 5 and 12 may be positioned at the centers of the reservoirs 8 and 10 respectively, and the coating composition discharge nozzles 6 and 41 may be positioned at the opposite end portions of the reservoirs 8 and 10, respectively. Further, the positions of the coating composition discharge nozzles 6 and 41 are not limited to the end portions of the reservoirs 8 and 10, but may be constituted by flow paths provided in a coating head block in the neighborhood thereof.

Although the coating head 40 is provided so as to be directed upward in the embodiment illustrated in FIG. 2, the coating head 40 may be made to face vertically downward to be in opposition to the web 4 if necessary.

Moreover, the present invention is not to be limited to such a coating method in which the backing roll 7 is provided as shown in the above embodiments, but may be applied to a coating method in which such a backing roll 7 is not provided, and the web 4 is disposed so as to directly contact with the top end of the head to perform coating by the ejection pressure of the coating composition 3 while forming a desired gap between the top end of the head and the web 4.

As has been described, in a coating method and apparatus according to the present invention, the configurations of the gap size of a slit, the ejection width of the slit, etc. are established in a coating head on the basis of an expression in which extremely important factors in practical coating, such as the coating composition viscosity $\eta_p$ in a reservoir, the pressure loss coefficient f(p) of coating composition, and the coating composition viscosity $\eta_s$ in the slit, are taken into consideration, and at the same time, an exchangeable resisting body is inserted in to the reservoir to make the flow resistance in the reservoir controllable, so that the same coating head can satisfy the just-mentioned expression for any coating conditions, the film thickness is stable all over the coated surface, and it is possible to perform coating with a high accuracy without occurrence of any color unevenness or any longitudinal stripes.

It is therefore possible to provide an inexpensive and easy coating method and apparatus by which it is possible to effectively restrain color unevenness or longitudinal stripes from being produced, and a superior coating state to uniformize the film thickness of a coating film can be realized corresponding to a wide-range of conditions of coating.

Next, novel effects of the coating method and apparatus according to the present invention will be made more clear by way of example.

After compositions of respective compositions shown in the following table were put into a ball mill, mixed and dispersed respectively, epoxy resin (epoxy equivalent 500) was added thereto by 30 parts by weight, mixed and dispersed uniformly, and made into magnetic coating compositions (magnetic dispersion liquids) A and B.

| <magnetic coating composition A> | |
| --- | --- |
| * $\gamma$-$Fe_2O_3$ powder (needle-like particles of average grain size in the direction of lengths: 0.5 μm, coercive force, 320 oersted) | 300 parts by weight |
| * copylymer of vinyl chloride-vinyl acetate (copolymerization ratio: 87:13, copolymerization degree: 400) | 30 parts by weight |
| * conductive carbon | 20 parts by weight |
| * polyamide resin (amin-valent: 300) | 15 parts by weight |
| * lecithin | 6 parts by weight |
| * silicon oil (dimethyl polysiloxane) | 3 parts by weight |
| * xylene | 300 parts by weight |
| * methyl isobutyl ketone | 300 parts by weight |
| * n-butanol | 100 parts by weight |
| <magnetic coating composition B> | |
| * strong magnetic metal minute powder (composition: Fe/Zn/Ni = 92/4/4, coercive force: 1600 oersted, BET specific surface area: 60 m²/g, needle ratio: 10) | 100 parts by weight |
| * copolymer of vinyl chloride-vinyl acetate (copolymerization degree: 300) | 12 parts by weight |
| * polyurethane resin (amin-valent: 300) | 3 parts by weight |
| * 1 α-alumina (particle size: 0.3 μm) | 2 parts by weight |
| * carbon black (particle size: 0.1 μm) | 0.5 parts by weight |
| * butyl stearate | 1 parts by weight |
| * stearic acid | 2 parts by weight |
| * methyl ethyl ketone | 200 parts by weight |

The balance viscosity of the magnetic coating compositions A and B thus obtained were measured by Simadzu Rheometer RM-1 made by Simadzu Seisakusho Corp., for the sake of reference, showing 24 and 21 poise at the shearing speed 10 sec$^{-1}$ respectively.

The Casson coefficients of the respective magnetic coating compositions A and B were as follows.

magnetic coating composition A: $S^{1/2}=0.356\times\gamma^{1/2}+14.138$ magnetic coating composition B: $S^{1/2}=0.209\times\gamma^{1/2}+14.085$ Further, by using the coating head 40 the basic structure of which was shown in FIGS. 1, 2 and 4 of the above embodiments as a coating apparatus, the above-mentioned magnetic coating composition A and B were deposited on the web 4 under the following coating conditions to thereby produce sample magnetic tapes while changing the diameter of the shaft 1 as a resisting body to 2.5 mm, and changing the flow rate of coating composition ejected from the slit 2 variously to 300, 500, 1,000, 2,000, and 3,000 cc/minute.

<coating conditions>

* Samples were made up while changing the coating speed to make the coating film thickness be 3 μm.
* Thickness of web: 15 μm
* Ejection width of the slit (w): 500 mm
* Gap quantity of the slit (d): 0.3 mm
* Inner diameter of reservoir (D): 15 mm
* Depth of slit on the coating composition supply side: 60 mm
* Depth of slit on the coating composition discharge side: 50 mm The rate of scattering of the ejection quantity distribution of the coating composition according to the present invention shown in the expression $$\frac{\frac{12\eta_s}{d^3 w} q(L_1 - L_2) - \frac{128}{\pi D^4}\left((1-k^4)\frac{(1-k^2)^2}{\ln(1/k)}\right)^{-1}\eta_p w Q}{\left[\frac{12\eta_s}{d^3 w} q(L_1 + L_2) + \frac{128}{\pi D^4}\left((1-k^4)\frac{(1-k^2)^2}{\ln(1/k)}\right)^{-1}\eta_p w Q\right] \times 0.5} \leq 0.05$$

was calculated on the respective coating conditions, and valuation was performed by measuring electromagnetic conversion forces of the respective sample magnetic tapes, and examining recorded/reproduced pictures through eyes. The results are shown in Table 1.

A spectrum analyzer made by YHP Corp. was used for the above measurement of the electromagnetic conversion forces, and signal outputs of 3.8 MHz and 5.0 MHz were measured on the magnetic coating compositions A and B respectively. In the visual examination of recorded/reproduced pictures, a test pattern was recorded/reproduced, and resolutions of monitored pictures were evaluated through eyes.

Further, in the valuation of Table 1, o expresses that the electromagnetic converted output and the recorded/reproduced picture image were superior, Δ expresses that the electromagnetic converted output had an output variation not less than 1 dB, and the recorded/reproduced picture image was superior, and X expresses that the electromagnetic converted output and the recorded/reproduced picture image were abnormal.

| Sample No. | Coating composition | Shaft diameter (R) (mm) | Ejection flow rate (q) (cc/min) | Scattering rate of ejection quantity distribution | Evaluation of coated surface |
|---|---|---|---|---|---|
| 1 | A | 2 | 3000 | 0.088 | X |
| 2 | | | 2000 | 0.069 | X Δ |
| 3 | | | 1000 | 0.032 | O Δ |
| 4 | | | 500 | 0.008 | O |
| 5 | | | 300 | 0.039 | O |
| 6 | | 5 | 3000 | 0.044 | O Δ |
| 7 | | | 2000 | 0.019 | O |
| 8 | | | 1000 | 0.032 | O |
| 9 | | | 500 | 0.087 | X |
| 10 | | | 300 | 0.127 | X |
| 11 | B | 2 | 3000 | 0.053 | Δ |
| 12 | | | 2000 | 0.033 | O |
| 13 | | | 1000 | 0.001 | O |
| 14 | | | 500 | 0.035 | O |
| 15 | | | 300 | 0.058 | X Δ |
| 16 | | 5 | 3000 | 0.000 | O |
| 17 | | | 2000 | 0.025 | O |
| 18 | | | 1000 | 0.071 | X |
| 19 | | | 500 | 0.115 | X |
| 20 | | | 300 | 0.145 | X |

As in apparent from Table 1, according to the coating apparatus based on the present invention, it was easy and possible to perform the optimum setting of a coating head for various coating conditions.

What is claimed is:

1. In a coating apparatus in which a part of a coating composition supplied to a reservoir is continuously discharged from one end of said reservoir and said coating composition is also discharged from a top end portion of a slit disposed in opposition to a surface of a continuously moving flexible belt support to thereby coat said surface of said continuously moving flexible belt support with a thin film of said coating composition the improvement wherein an exchangeable resisting body is inserted into said reservoir to adjust flow resistance in said reservoir, wherein said exchangeable resisting body adjusts flow resistance under a condition to satisfy the following expression $$\frac{\frac{12\eta_s}{d^3 w} q(L_1 - L_2) - f(p)\eta_p w Q}{\left[\frac{12\eta_s}{d^3 w} q(L_1 + L_2) + f(p)\eta_p w Q\right] \times 0.5} \leq 0.05$$

in which d represents the gap quantity of said slit, $L_1$ represents the slit depth from a coating composition supply side end of said reservoir to said top end portion of said slit, $L_2$ represents the slit depth from the coating composition discharge side end of said reservoir to said top end portion of said slit, w represents the ejection width of said slit, $\eta_p$ represents the viscosity of the coating composition in said reservoir, $\eta_s$ represents the viscosity of the coating composition in said slit, Q represents the average flow rate in said reservoir, q represents the flow rate of the coating composition ejected from said slit, and f(p) represents the pressure loss coefficient of the coating composition in said reservoir, and wherein said apparatus further satisfies the following expression $$\frac{\frac{12\eta_s}{d^3 w} q(L_1 - L_2) - \frac{128}{\pi D^4}\left((1-k^4)\frac{(1-k^2)^2}{\ln(1/k)}\right)^{-1}\eta_p w Q}{\left[\frac{12\eta_s}{d^3 w} q(L_1 + L_2) + \frac{128}{\pi D^4}\left((1-k^4)\frac{(1-k^2)^2}{\ln(1/k)}\right)^{-1}\eta_p w Q\right] \times 0.5} \leq 0.05$$

in which D represents the inner diameter of said reservoir, R represents the diameter of said resisting body, and k represents the inner diameter ratio (R/D) of said reservoir.

2. An apparatus according to claim 1 wherein said exchangeable resisting body comprises a cylindrical shaft.

3. An apparatus according to claim 1 further comprising:
- a feeding pump coupled to said coating composition supply side end of the reservoir to supply the coating composition to said reservoir;
- a drawing pump coupled to said coating composition discharge side end of the reservoir to draw the coating composition out of said reservoir; and
- wherein the flow rate of the coating composition ejected from said slit is adjusted by adjusting a flow rate of said feeding pump and a flow rate of said drawing pump.

4. An apparatus according to claim 1 wherein said exchangeable resisting body comprises a mixing member having a spiral portion.

5. An apparatus according to claim 1 wherein said continuously moving flexible belt support contacts said top end portion before said coating composition is ejected from said slit.

6. An apparatus according to claim 1 further comprising:
- a backing roller disposed in contact with said continuously moving flexible belt support to support said continuously moving flexible belt support at a position opposite said top end.

* * * * *